United States Patent
Gupta et al.

(10) Patent No.: US 9,734,013 B2
(45) Date of Patent: Aug. 15, 2017

(54) SYSTEM AND METHOD FOR PROVIDING OPERATING SYSTEM INDEPENDENT ERROR CONTROL IN A COMPUTING DEVICE

(71) Applicant: QUALCOMM INCORPORATED, San Diego, CA (US)

(72) Inventors: Mohit Gupta, San Diego, CA (US); Harb Abdulhamid, Durham, NC (US); Zhixiong Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 14/879,499

(22) Filed: Oct. 9, 2015

(65) Prior Publication Data

US 2017/0102995 A1 Apr. 13, 2017

(51) Int. Cl.
*H03M 13/00* (2006.01)
*G06F 11/10* (2006.01)
*G06F 3/06* (2006.01)

(52) U.S. Cl.
CPC ........ *G06F 11/1076* (2013.01); *G06F 3/0619* (2013.01); *G06F 3/0659* (2013.01); *G06F 3/0673* (2013.01)

(58) Field of Classification Search
CPC .. G06F 11/1076; G06F 3/0619; G06F 3/0659; G06F 3/06773
See application file for complete search history.

(56) References Cited

U.S. PATENT DOCUMENTS

| | | | |
|---|---|---|---|
| 6,119,248 A | 9/2000 | Merkin | |
| 8,219,851 B2* | 7/2012 | Swanson | G06F 11/073 714/6.1 |
| 8,615,679 B2* | 12/2013 | Smith | G06F 11/1076 714/5.1 |
| 9,026,865 B2 | 5/2015 | Entezari et al. | |
| 2003/0037280 A1 | 2/2003 | Berg et al. | |
| 2009/0327638 A1 | 12/2009 | Buch | |
| 2011/0161726 A1* | 6/2011 | Swanson | G06F 11/073 714/6.12 |
| 2015/0067437 A1 | 3/2015 | Bains et al. | |

OTHER PUBLICATIONS

International Search Report and Written Opinion—PCT/US2016/051031—ISA/EPO—dated Oct. 27, 2016.

* cited by examiner

*Primary Examiner* — Sam Rizk
(74) *Attorney, Agent, or Firm* — Smith Tempel Biaha LLC

(57) ABSTRACT

Systems and methods are disclosed for providing operating system independent error control in computing devices. One embodiment is a method comprising: defining with a reliability, availability and serviceability (RAS) controller a first memory region for correctable errors and a second memory region for uncorrectable errors; receiving an error indication at the RAS controller; determining with the RAS controller whether the received error indication is a correctable error; and in response to the determination, if the received error indication is a correctable error, writing with the RAS controller information about the correctable error to the first memory region, and if the received error indication is an uncorrectable error, writing with the RAS controller information about the uncorrectable error to the second memory region and sending an interrupt request from the RAS controller to an operating system executing on a processor.

30 Claims, 9 Drawing Sheets

SYSTEM AND METHOD FOR PROVIDING OPERATING SYSTEM INDEPENDENT ERROR CONTROL IN A COMPUTING DEVICE

DESCRIPTION OF THE RELATED ART

Portable computing devices (e.g., cellular telephones, smart phones, tablet computers, portable digital assistants (PDAs) and portable game consoles) and other computing devices such as servers continue to offer an ever-expanding array of features and services, and provide users with unprecedented performance levels. To keep pace with these service enhancements and need for increased performance levels, such computing devices, including portable computing devices (PCDs) and servers have become more powerful and more complex. Such computing devices now commonly include a system on chip (SoC) comprising one or more chip components embedded on a single substrate (e.g., one or more central processing units (CPUs), microprocessors, digital signal processors, etc.). The SoC may be coupled to one or more memory devices, located both on the SoC and off the SoC, such as dynamic random access memory (DRAM) via one or more data communication bus.

Operation of applications or processes on one or more of the processors of the SoC can lead to the generation of various errors, such as single-bit and/or double-bit errors at one or more memory. In typical computing devices such an error results in the generation of an interrupt to the CPU executing the operating system, resulting in performance degradation and/or latency for applications being operated by the CPU. However, not every error generating an interrupt requires immediate action by the operating system to correct. Computing devices, especially computing devices with ARM-based processors, do not have the ability to differentiate between errors requiring immediate action, and errors that do not require immediate action, or to separately handle different types of errors without action by the operating system.

Accordingly, there is a need to provide systems and methods for providing operating system independent error control in these computing devices, and in particular, systems and methods that can work regardless of the operating system that may be implemented by one or more processors of the computing device.

SUMMARY OF THE DISCLOSURE

Systems, methods, and computer programs are disclosed for providing operating system independent error control in computing devices. One embodiment is a method comprising: defining with a reliability, availability and serviceability (RAS) controller a first memory region for correctable errors and a second memory region for uncorrectable errors; receiving an error indication at the RAS controller; determining with the RAS controller whether the received error indication is a correctable error; and in response to the determination, if the received error indication is a correctable error, writing with the RAS controller information about the correctable error to the first memory region, and if the received error indication is an uncorrectable error, writing with the RAS controller information about the uncorrectable error to the second memory region and sending an interrupt request from the RAS controller to an operating system executing on a processor.

Another embodiment is a system comprising a system on chip (SoC) comprising a processing device executing an operating system and a reliability, availability and serviceability (RAS) controller coupled to the processing device. The RAS controller is configured to define a first memory region for correctable errors and a second memory region for uncorrectable errors. The RAS controller receives an error indication and determines whether the error indication is for a correctable error. If the received error indication is a correctable error, the RAS controller writes information about the correctable error to the first memory region. If the received error indication is an uncorrectable error, the RAS controller writes information about the uncorrectable error to the second memory region and sends an interrupt request to the operating system.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" or "image" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone", "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device may include a cellular telephone, a pager, a PDA, a smartphone, a navigation device, or a hand-held computer with a wireless connection or link.

Figure 1:
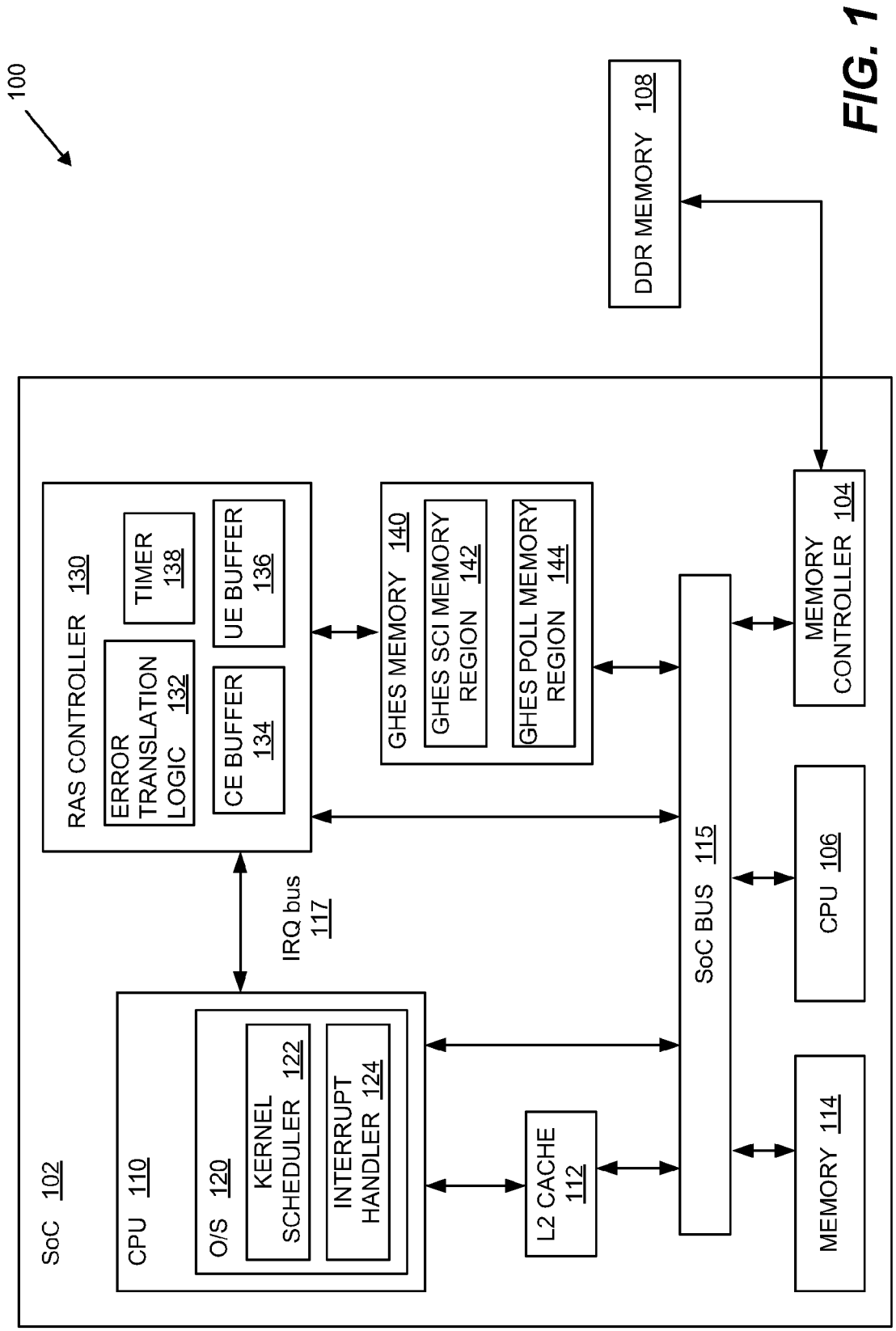
FIG. 1 is a block diagram of an embodiment of a system for providing operating system independent error control in computing devices.

FIG. 1 illustrates an embodiment of a system 100 for providing operating system independent error control in these computing devices. The system 100 may be implemented in any computing device, including a personal computer, a workstation, a server, a portable computing device (PCD), such as a telephone, a portable digital assistant (PDA), a portable game console, a laptop computer, or a tablet computer. The system 100 of FIG. 1 comprises a system on chip (SoC) 102 that includes various on-chip or on-die components interconnected via SoC bus 115, which may be any type of interconnect to allow communications on the SoC. 102. As would be understood other configurations of the system 100 are possible, including systems that do not include an SoC 102.

The SoC 102 may be of any desired architecture. In an embodiment, the SoC 102 may be an ARM-based architecture or a non-ARM-based architecture if desired and includes one or more processing devices, such as a digital signal processor, (DSP), central processing unit (CPU) or any other type of processor. In the embodiment illustrated in FIG. 1, the SoC 102 includes two CPUs 106, 110 and a reliability, availability and serviceability controller (RAS Controller) 130, which may be implemented as a separate processor from the CPU 106, 110 in some embodiments. In other embodiments, the RAS Controller 130 may be a part, portion, or component of one of the CPU 106 or CPU 110.

CPU 110 of FIG. 1 executes the operating system (O/S) 120 for the system 100, which may be a high-level operating system (HLOS). CPU 110 may further include drivers, hardware interfaces, and/or other components necessary to run the O/S 120. The O/S 120 may include a kernel scheduler 122 for scheduling tasks or threads to be performed by one or more of CPU 110 or CPU 106, such as to execute an application or process on CPU 110 and/or CPU 106. O/S 120 may further include an interrupt handler 124 to handle interrupt requests received by the O/S 120 during operation.

CPU 110 is also shown in communication with an L2 cache 112, which may be a dedicated cache memory for the CPU 110 or may be a cache memory shared with other processors, such as CPU 106, and may be a different level of cache such as an L3 cache in some embodiments. In other embodiments, the L2 cache 112 may instead be part of the CPU 110 instead of a separate component on the SoC 102. The CPU 110 may also be in communication with other memory devices, such as memory 114 illustrated as being located on SoC 102, and DDR memory 108 illustrated as being located off-chip or off-die (i.e. external to SoC 102). It will be appreciated that the memory 114 may comprise any desired type of memory, such as, for example non-volatile memory flash memory, a Secure Digital (SD) card, a solid-state drive (SSD), or other types of memory. DDR memory 108 may likewise be any double data rate memory (or any generation of such DDR memory like DDR2, DDR3, etc.) and may be a synchronous dynamic random-access memory (DDR SDRAM) or other type of random-access memory such as SRAM.

One or more of the memory 114, DDR memory 108 and/or L2 cache 112 may be controlled by a memory controller 104 coupled to the SoC bus 115, allowing CPUs 106, 110 to read and/or write one or more of memory 114, DDR memory 108 and/or L2 cache 112. Error correction capability may be implemented by one or more of memory controller 104, memory 114, DDR memory 108 and/or L2 cache 112. Such error correction may include error correcting code (ECC) capability. For example, data may be stored or retrieved from memory 114, DDR memory 108 and/or L2 cache 112 along with error correction bit(s) generated/checked by ECC or another algorithm (such as an algorithm in the memory controller 104 or in the memory itself) to detect read or write errors in or more of memory 114, DDR memory 108 and/or L2 cache 112.

The output of such error detection, any bus errors on SoC bus 115, and/or any other desired error source (such as peripheral errors in some embodiments) are wired or directed to RAS Controller 130. RAS Controller 130 may be a firmware or hardware component, and in some embodiments may be a processing device separate from CPU 110 and/or CPU 106. In other embodiments, (not illustrated) RAS Controller 130 may instead be a part or component of CPU 110, such as firmware within CPU 110.

RAS Controller 130 may include various components such as error translation logic 132 as desired. RAS Controller 130 may use error translation logic 132 or other logic to determine the type of error received. In an embodiment, determining the type of error comprises determining if the error is a correctable error that a hardware component, (such as memory 114) can itself correct, or is an uncorrectable error that requires more immediate attention from the O/S 120. The RAS Controller 130 may also use the error translation logic 132 to translate received errors into a standardized or generic format, such as generic hardware error source (GHES), to allow RAS Controller 130 to operate with any O/S 120 (e.g. Linux version, Windows, etc.) that a manufacturer or end user may implement on CPU 110. In other embodiments, determining the type of error and translating to a standardized format like GHES may be performed by separate logic within or in communication with the RAS Controller 130. In yet other embodiments, the memory or other component may already provide the error message in a standardized format like GHES such that additional translation by the RAS Controller 130 is not needed.

The SoC 102 of the system 100 may also include a memory for storing errors, such as memory 140, which in the embodiment of FIG. 1 is a GHES memory 140. GHES memory 140 may include different regions for storing different types of errors. As illustrated in FIG. 1. These regions may include GHES interrupt memory region 142 and GHES poll memory region 144. In the embodiment illustrated in FIG. 1, the interrupt memory region 142 is a system control interrupt (SCI) memory region. In other embodiments, the type of interrupt could be a local interrupt, external interrupt, GPIO interrupt, not-maskable interrupt, or any other kind of asynchronous exception that could be redirected to the RAS Controller 130. As discussed below, the RAS Controller 130 causes information about uncorrectable errors to be stored in the GHES SCI memory region 142, while information about correctable errors are stored in the GHES poll memory region 144. In some embodiments, the two memory regions 142, 144 may be regions of a single memory device, while in other embodiments, the two memory regions 142, 144 may be separate memory devices.

Turning back to RAS Controller 130, the embodiment illustrated in FIG. 1 also includes buffers for correctable errors (CE buffer 134) and for uncorrectable errors (UE buffer 136). The error buffers 134, 136 may be any desired type of buffer memory or cache and may be part of the RAS Controller 130 such as in internal SRAM buffer of the RAS Controller 130. In other embodiments the error buffers 134, 136 may be located remotely from the RAS Controller 130. As discussed below, after the RAS Controller 130 writes or stores an error in one or more of the GHES SCI memory region 142 or GHES poll memory region 144, the RAS Controller 130 cannot write subsequent errors received at the RAS Controller 130 to the GHES memory regions 142, 144 until the O/S 120 has handled error.

As discussed below, the O/S 120 may send or provide an acknowledgement to the RAS Controller 130 after the O/S 120 has handled errors stored one or more of the GHES memory regions 142, 144. In such embodiments, once the RAS Controller 130 has written an error to one or more of the GHES memory regions 142, 144, any subsequent error notifications received by the RAS Controller 130 are stored in the appropriate buffer, CE buffer 134 or UE buffer 136 until the RAS Controller 130 receives the acknowledgement from the O/S 120 that the previous error has been handled. In this way, the error buffers 134, 136 allow the RAS Controller 130 to avoid overwriting error information stored in the GHES memory regions 142, 144 before the O/S 120 has an opportunity to handle the error(s). Additionally, as discussed below, the RAS Controller 130 may use the error buffers 134, 136 to detect and/or address nonresponsive O/S 120 conditions or states.

The RAS Controller 130 may have more or fewer components than those illustrated in FIG. 1. For example, although illustrated as part of the GHES memory 140 in FIG. 1, one or both of GHES SCI memory region 142 and GHES poll memory region 144 may be located elsewhere, and in some embodiments may be part of the RAS Controller 130. In other embodiments the memory regions 142, 144 may not be part of a memory device dedicated to errors, but may instead be regions in a general memory, such as memory 114 for example. In yet other embodiments, the memory regions 142, 144 may be located outside the SoC 102 (i.e. off-die). Similarly, in some embodiments, the RAS Controller 130 may be located outside the SoC 102 (i.e. off-die) and/or a single RAS Controller 130 may perform the error handling for multiple different SoCs 102 (see FIG. 5).

As also illustrated in FIG. 1, RAS Controller 130 is in communication with CPU 110 and/or O/S 120 via an interrupt request (IRQ) bus 117. As discussed below, rather than the various memory errors, bus errors, and other desired errors resulting in interrupt requests sent to the O/S 120, the errors are first received at the RAS Controller 130 which may then generate an interrupt request when appropriate and send the interrupt request to the O/S 120 such as via the IRQ bus 117.

RAS Controller 130 may include various other components beyond those illustrated in FIG. 1 and/or perform other functions as desired in other embodiments. For example, one of ordinary skill understands that the number, rate, and/or timing of correctable errors in various hardware like memory devices may indicate component degradation, excessive operating temperatures, etc. RAS Controller 130 may therefore also contain logic to provide reliability monitoring, such as to monitor the health of an SoC 102 and/or the components of the SoC 102, using for example rates of correctable errors or rates of increase in correctable errors to predict component failure and/or provide alerts about component health.

Figure 2A:
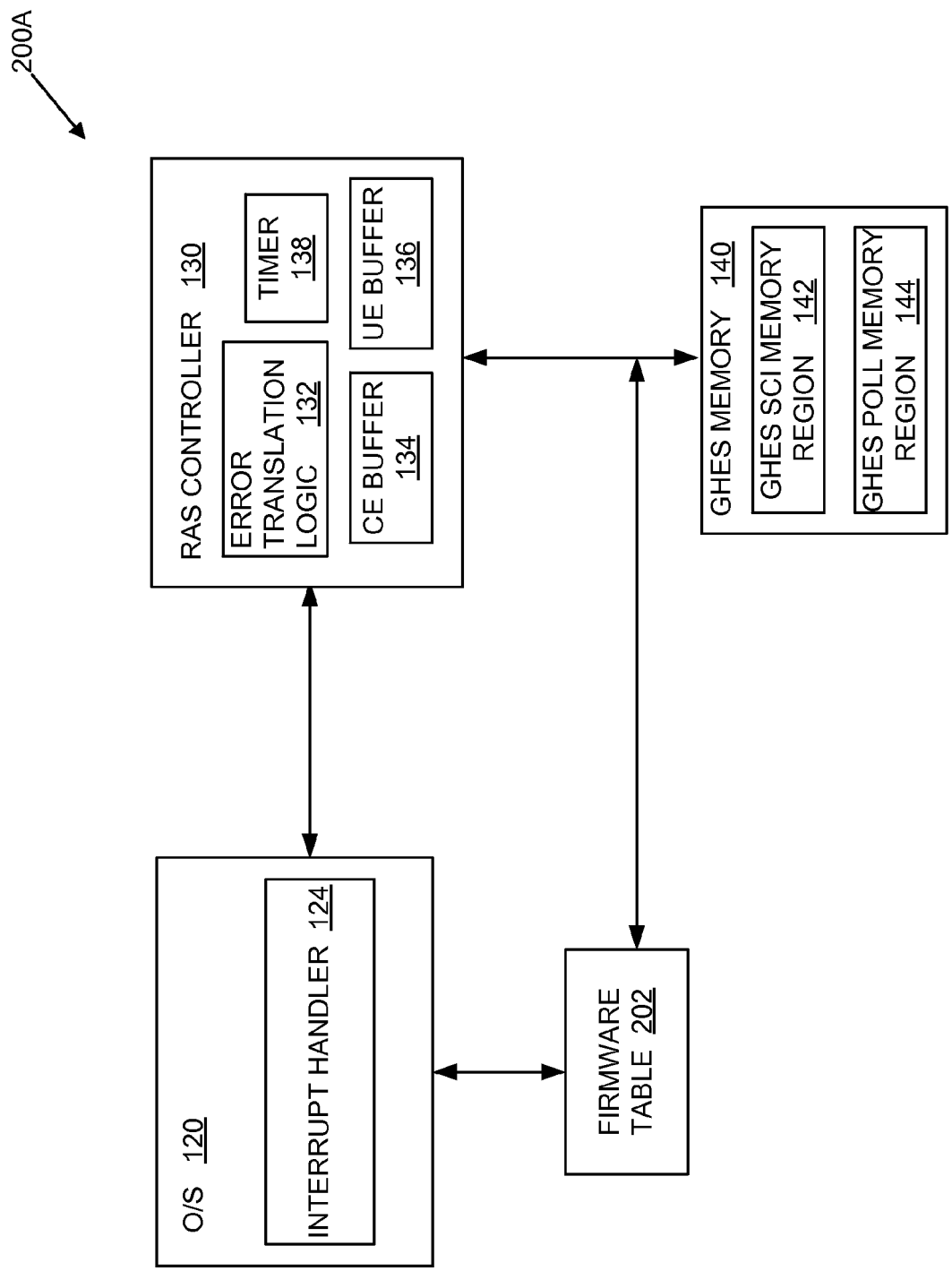
FIG. 2A is a block diagram illustrating exemplary aspects and inter-operations of portions of the system of FIG. 1.
Figure 2B:
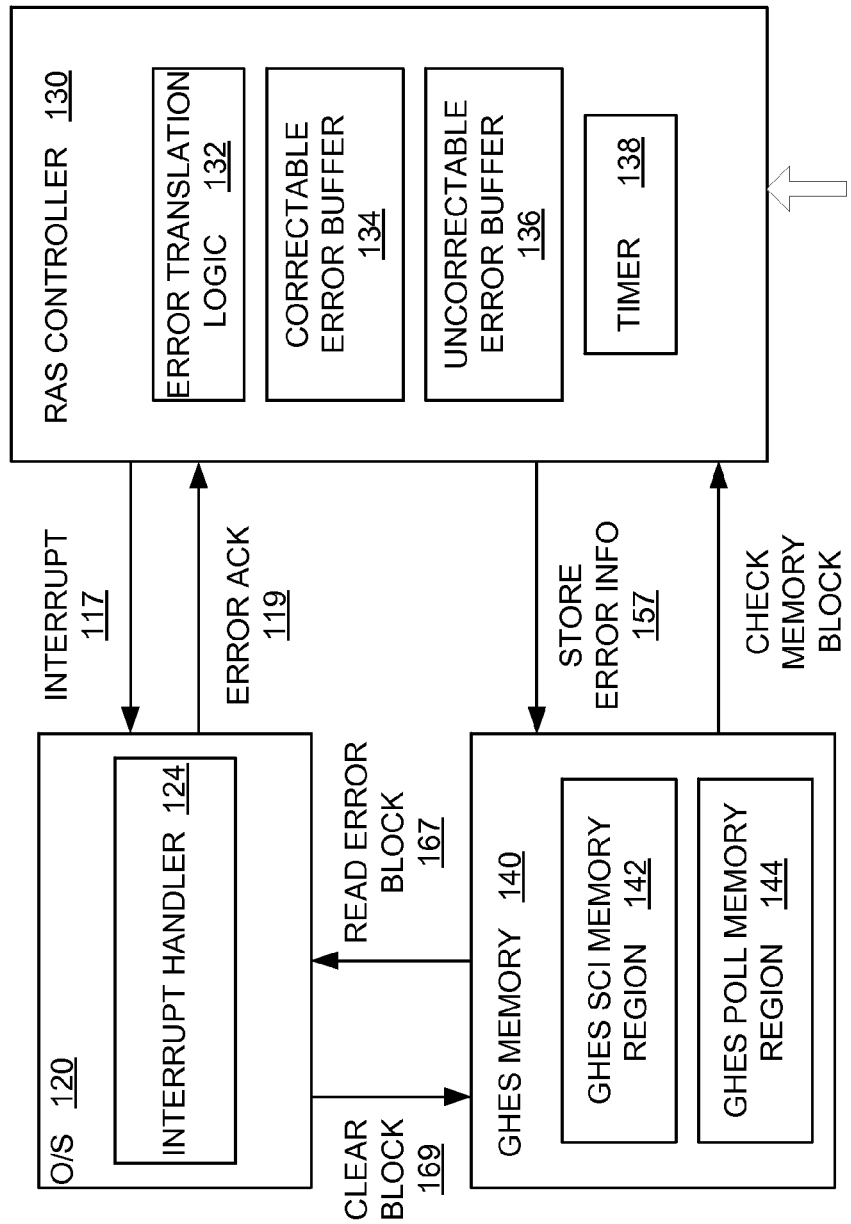
FIG. 2B is a block diagram illustrating additional exemplary aspects and inter-operations of portions of the system of FIG. 1.

FIG. 2A-2B are block diagrams illustrating exemplary aspects and inter-operations of portions of the system 100 of FIG. 1. As shown in FIG. 2A, the RAS Controller 130 defines the GHES SCI memory region 142 where information about uncorrectable errors will be stored. The RAS Controller 130 also defines the GHES polling region 144 where information about correctable errors will be stored. Before operation of the system 100 illustrated in FIG. 1, the RAS Controller 130 communicates the location of these memory regions 142, 144 to the O/S 120 so that the O/S 120 will know where to find the error information for both correctable and uncorrectable errors.

In an embodiment, the RAS Controller 130 may communicate the location of the memory regions 142, 144 directly to the O/S 120, such as when the O/S 120 is booting. For such embodiments, the RAS Controller 130 will tell the O/S 120 to periodically poll the GHES poll memory region 144 in order to handle less-critical correctable errors that will have information stored in the GHES poll memory region 144. Such polling may be made at periodic intervals (which may be fixed intervals or changeable intervals), at times when the CPU 110 is operating below a certain workload threshold (i.e. when the CPU 110 is not "busy"), and/or a combination of these.

In some embodiments, the RAS Controller 130 may write the locations of the memory regions 142, 144 to a memory address, boot file, location, or table, such as firmware table 202, that the O/S 120 accesses and/or that is loaded to the O/S 120 during boot up. In this manner, when the O/S 120 boots, the locations of the two different memory regions 142, 144 may be automatically loaded to the O/S 120. In such embodiments, the RAS Controller 130 will tell the O/S 120—either directly or by instructions placed in the memory address, boot file, or firmware table 202—to periodically poll the GHES poll memory region 144 in order to handle less-critical correctable errors that may be placed in the GHES poll memory region 144 during operation. Again, the O/S 120 may be instructed to poll at fixed or variable periodic intervals, at times when the CPU 110 is not busy, and/or a combination of these. Use of the RAS Controller 130 in this manner allows for improved error handling for a wide variety of operating systems such as versions of Linux, Windows, etc., without the need to create customized error handling systems or code for each different type of operating system.

During operation of the system 200, as illustrated in the FIG. 2B, the RAS Controller 130, rather than the O/S 120 receives error interrupts, such as from memory 114, DDR memory 108, L2 cache 112, bus errors on the SoC bus 115, or even software errors in some embodiments. For example, if a process or application attempts to access a memory location for a memory that has been powered down, an error may be generated and sent to the RAS Controller 130, even though the memory itself does not have an error. As discussed above, additional errors may be wired to or forwarded to the RAS Controller 130 as desired, such as peripheral errors, disc errors, PCI errors, etc. Once the error is received, the RAS Controller 130 uses logic, such as error translation logic 132 to determine whether the error is a correctable error or uncorrectable error and/or to translate the error information into a standardized format such as GHES. RAS Controller 130 may perform both of the translation and determination of error type as part of a single action, or as separate actions or steps using the same logic or using different logic in various embodiments.

An example is an embodiment where the error received at the RAS Controller 130 is from a memory device, such as memory 114 of FIG. 1. A correctable error may be a single bit error in the memory 114 that either the memory 114 or the memory controller 104 can correct, such as by using ECC as discussed above. For such correctable errors, the memory 114 or memory controller 104 corrects the error and sends the interrupt request or other error notification as usual. However, the interrupt request is received by the RAS Controller 130 rather than the O/S 120 as would occur in typical systems. Continuing the example, an uncorrectable error may be a double bit error (or another type of uncorrectable error) that the memory 114 and/or memory controller 104 cannot correct, even with ECC. For such uncorrectable errors, the interrupt request is sent as usual but is received by the RAS Controller 130 rather than the O/S 120. As would be understood other types of correctable and/or uncorrectable errors are possible.

Once the error notification/interrupt request is received at the RAS Controller 130 in the above example, the RAS Controller 130 translates the error into a generic format, such as GHES and determines whether the error notification is for an uncorrectable error or a correctable error. If the error notification received by the RAS Controller 130 is for a correctable error, RAS Controller 130 writes information about the error to the GHES poll memory region 144 and takes no further action for that particular error notification (other than a possible confirmation of receipt to the component sending the error to the RAS Controller 130). The O/S 120, according to the instructions previously sent by the RAS Controller 130 and/or loaded to the O/S 120 at boot, will poll the GHES poll memory region 144 at a future time and take the necessary action(s), if any, at that time to address the correctable error associated with the information stored in the GHES poll memory region 144.

For example, in the embodiment illustrated in FIG. 2B, the O/S 120 may read the error information from the GHES poll memory region 144 (read error block 167). The O/S 120 may then take whatever action, if any, necessary to handle the error. Once finished handling the error, the O/S 120 may then delete the information about the error from the GHES poll memory region 144 (clear block 169). Then the O/S 120 may send an acknowledgment to the RAS Controller 130 that the error has been handled (error acknowledgement 119) so that the RAS Controller 130 can write the next error to the now-cleared memory block of the GHES poll memory region 144.

The error acknowledgement 119 of FIG. 2B may be accomplished in any desired manner. For example, the error acknowledgement 119 may be an interrupt sent directly from the O/C 120 to the RAS Controller 130 in some embodiments. In other embodiments, the error acknowledgement 119 may comprise the O/S 120 writing to a registry. In such embodiments, the registry is either hardwired to send an interrupt to the RAS Controller 130, or the RAS Controller 130 may poll the registry for the error acknowledgement 119 from the O/S 120.

Continuing with the example, in the event that the RAS Controller 130 receives a second (or third) error interrupt/notification of an additional correctable error before an error acknowledgement 119 is received from the O/S 120, the RAS Controller 130 will store the information about the second (or third) correctable error in the correctable error (CE) buffer 134. Use of the CE buffer 134 before receiving the error acknowledgement 119 allows the RAS Controller 130 to avoid overwriting error information in the GHES poll memory region 144 before the O/S 120 has an opportunity to handle the error, and also avoids other potential timing issues that can result from the RAS Controller 130 operating independently of the O/S 120.

Note that in some embodiments the error acknowledgement 119 will contain, or point to, information that identifies which error has been handled by the O/S 120. In the above example, this can include information informing the RAS Controller 130 that a correctable error has been handled by the O/S 120 and/or that a memory block of the GHES poll memory region 144 has been cleared or deleted by the O/S 120 after addressing the correctable error.

In the embodiment illustrated in FIG. 2B, the error acknowledgement 119 does not contain such identifying information, so after receiving the error acknowledgement 119, the RAS Controller 130 will determine which error has been handled by the O/S 120. The RAS Controller 130 of FIG. 2B determines which error has been handled by checking the memory blocks (check memory block 159) of the GHES memory 140 to see which of the GHES SCI memory region 142 and/or GHES poll memory region 144 have been cleared by the O/S 120.

Concluding the above example of a correctable error, after determining which error has been handled by the O/S 120 (either from information in the error acknowledgement 119 or by checking the memory blocks 159) the RAS Controller 130 can write any subsequent received correctable errors to the GHES poll memory region 144. If there is error information queued in the CE buffer 134, writing the GHES poll memory region 144 may comprise writing the next-in-line error information from the CE buffer 134 to the GHES poll memory region 144.

In the embodiment of FIG. 2B and FIG. 1, the CE buffer 134 is a fixed size and may be sized to store information about a number of correctable errors that are expected or estimated during normal operation of the system 200 (and/or system 100 of FIG. 1). If correctable errors continue to be stored or queued in CE buffer 134, with no error acknowledgement 119 from the O/S 120, the CE buffer 134 will overflow. Such overflow of the CE buffer 134 may be used by the RAS Controller 130 as an indication that the O/S 120 or system 200 is not operating "normally" and/or that the O/S 120 has become nonresponsive. The RAS Controller 130 may then take appropriate action as desired in response to the CE buffer 134 overflow. For example, if the CE buffer 134 overflows, the RAS Controller 130 may generate a new uncorrectable error that is written to the GHES SCI memory region 142, and the RAS Controller 130 may generate an interrupt 117 for the O/S 120.

Turning to uncorrectable errors, the operation of the system 200 is similar to the operation discussed above for correctable errors received by (or generated by) the RAS Controller 130. Thus, if the error notification received (or generated) by the RAS Controller 130 in FIG. 2B is an uncorrectable error, RAS Controller 130 writes information about the error to the GHES SCI memory region 142 and also sends an interrupt request to the O/S 120, such as through IRQ bus 117. The O/S 120 upon receiving the interrupt request can immediately review the information about the error in the GHES SCI memory region 142 and take the necessary action(s), if any, to address the uncorrectable error. For example the interrupt handler 124 of the O/S 120 may in an embodiment determine that the data regions for the uncorrectable error is corrupted and stop or re-start the process or application attempting to access the corrupted data region without use of corrupted data region. In other examples, the O/S 120 may determine that the uncorrectable error is in a critical area, such as the kernel and may reboot the entire system.

In the embodiment illustrated in FIG. 2B, the O/S 120 may read the error information from the GHES SCI memory region 142 (read error block 167). The O/S 120 may then take whatever action, if any, necessary to handle the uncorrectable error. Once finished handling the error, the O/S 120 may then delete the information about the error from the GHES SCI memory region 142 (clear block 169). Then the O/S 120 may send an acknowledgment to the RAS Controller 130 that the error has been handled (error acknowledgement 119) so that the RAS Controller 130 can write the next uncorrectable error, if any, to the now-cleared memory block of the GHES SCI memory region 142. The error acknowledgement 119 of FIG. 2B may be accomplished in any desired manner as discussed above with respect to correctable errors.

Similar to the discussion above for correctable errors, in the event that the RAS Controller 130 receives a second (or third) error interrupt/notification of additional uncorrectable correctable error(s) before an error acknowledgement 119 is received from the O/S 120, the RAS Controller 130 will store the information about the second (or third) uncorrectable error in the uncorrectable error (UE) buffer 136. Use of the UE buffer 136 before receiving the error acknowledgement 119 again allows the RAS Controller 130 to avoid overwriting error information in the GHES SCI memory region 142 before the O/S 120 has an opportunity to handle the error, and also avoids other potential timing issues that can result from the RAS Controller 130 operating independently of the O/S 120.

As discussed, in some embodiments the error acknowledgement 119 will contain, or point to, information that identifies which error has been handled by the O/S 120. In other embodiments, the error acknowledgement 119 will not contain such information and the RAS Controller 130 may determine which error has been handled such as by checking the GHES memory regions 142, 144 (check memory block 159) to see which memory blocks have been deleted as a result of the O/S 120 handling the error.

Concluding the example of an uncorrectable error, after determining which error has been handled by the O/S 120 (either from information in the error acknowledgement 119 or by checking the memory blocks 159) the RAS Controller 130 can write any subsequent received uncorrectable errors to the GHES SCI memory region 142. If there is error information queued in the UE error buffer 136, writing the GHES SCI memory region 142 may comprise writing the next-in-line error information from the UE buffer 136 to the GHES SCI memory region 142. Additionally, a new timer 138 may be set/the timer 138 may be reset for this new write of information to the GHES SCI memory region 142.

In embodiments where the timer 138 is set when an uncorrectable error is written to the GHES SCI memory region 142, the timer 138 may be used to determine that the O/S 120 is, or has become, nonresponsive. For example, if an error acknowledgement 119 is not received by the RAS Controller 130 before the timer 138 expires, the RAS Controller 130 may determine that the O/S 120 is nonresponsive. The RAS Controller 130 may then take appropriate action in response to the expiration of the timer 138. In an embodiment, if the timer 138 expires the RAS Controller 130 may cause one or more components to restart or reboot. The reboot may comprise a warm reboot of less than the entire system 200 (or system 100 of FIG. 1) or a cold restart of the entire system 100/200 in different embodiments.

In some embodiments the RAS Controller 130 may determine the type of reboot depending on the uncorrectable error information written to the GHES SCI memory region—e.g. if the uncorrectable error is from a component of the system 100/200 that may be rebooted with a warm reboot, such as a PCI error. In other embodiments, when the timer 138 expires the RAS Controller 130 may first perform a warm reboot to bring the system 100/200 to a stable or known state and preserve the error information before performing a cold reboot of the system 100/200. Preserving the error information in such embodiments may comprise the RAS Controller 130 storing information about the uncorrectable error associated with the expired timer 138 in a persistent memory that is available to or accessed by the O/S 120 after reboot.

As illustrated in FIGS. 2A-2B, the system 100/200 only allows interruptions of the O/S 120 when there are uncorrectable errors, such as data or memory region corruption in the case of errors from memory devices. The system 100/200 prevents interruptions of the O/S 120 for the more frequent, and less important, correctable errors. In this way, the system 100/200 reduces the performance hits and/or latency for the CPUs 110, 106 caused by interrupts for correctable errors. Such bifurcated error handling is especially useful for ARM-based processors or SoCs 102 and other architectures that do not provide for separate handling of correctable and uncorrectable errors. Additionally, the system 100 may provide greater benefits in embodiments where the RAS Controller 130 is implemented as a separate processor apart from the CPU 110, 106 executing the O/S 120 and/or various applications, threads, or processes.

Figure 3:
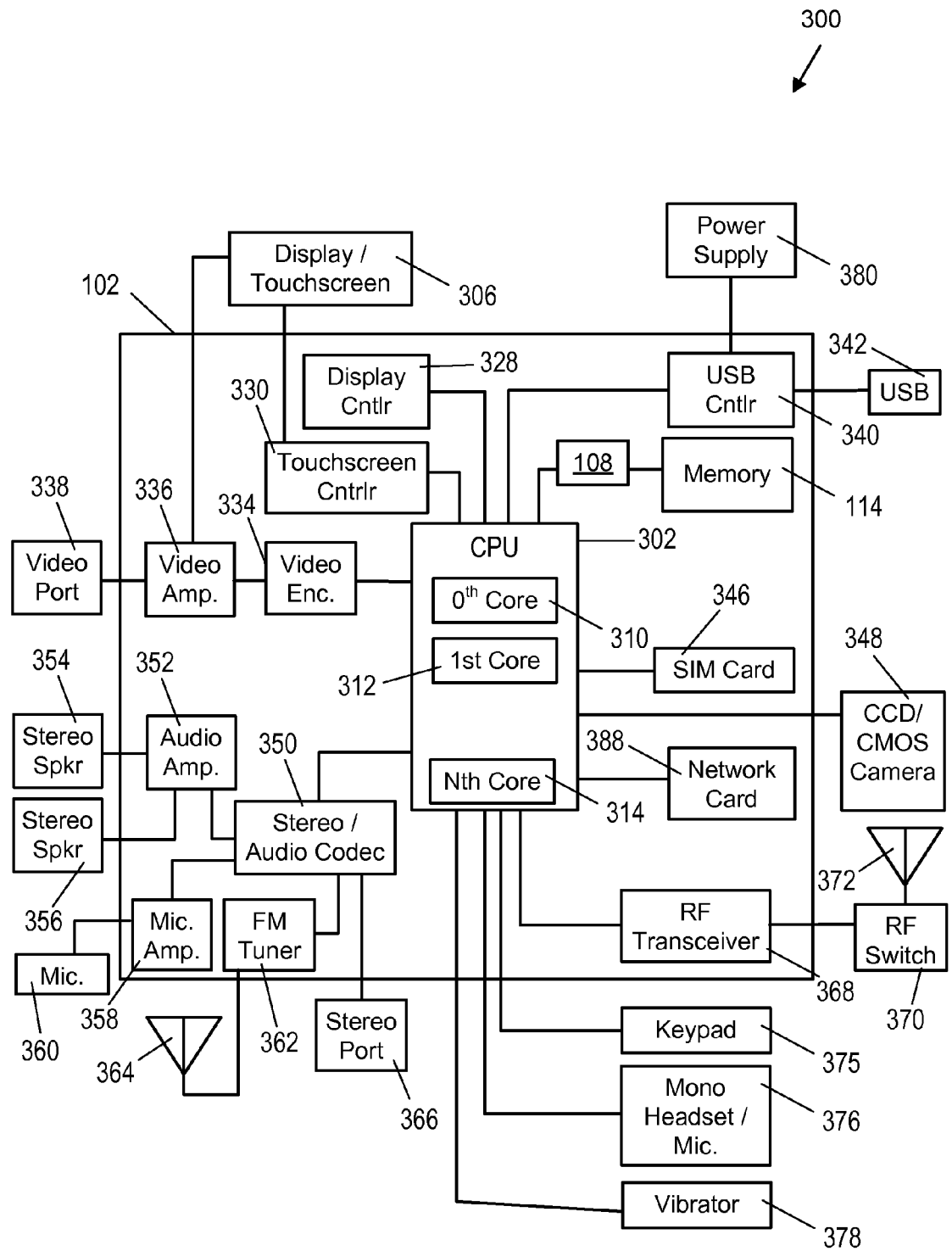
FIG. 3 is a block diagram of an exemplary embodiment of a computing device that may incorporate the systems and methods for providing operating system independent error control.

As mentioned above, the system 100 may be incorporated into any desired computing system or device. FIG. 3 illustrates an exemplary portable computing device (PCD) 300 comprising SoC 102. In this embodiment, the SoC 102 includes a multicore processor (CPU) 302. The multicore CPU 302 may include a zeroth core 310, a first core 312, and an Nth core 314. One of the cores may comprise, for example, a graphics processing unit (GPU) with one or more of the others comprising a general CPU (such as CPU 110 of FIG. 1 operating the O/S 120).

A display controller 328 and a touch screen controller 330 may be coupled to the CPU 302. In turn, the touch screen display 306 external to the SoC 102 may be coupled to the display controller 328 and the touch screen controller 330.

FIG. 3 further shows that a video encoder 334, e.g., a phase alternating line (PAL) encoder, a sequential color a memoire (SECAM) encoder, or a national television system(s) committee (NTSC) encoder, is coupled to the multicore CPU 302. Further, a video amplifier 336 is coupled to the video encoder 334 and the touch screen display 306. Also, a video port 338 is coupled to the video amplifier 336. As shown in FIG. 13, a universal serial bus (USB) controller 340 is coupled to the multicore CPU 302. Also, a USB port 342 is coupled to the USB controller 340. Memory 114 and a subscriber identity module (SIM) card 346 may also be coupled to the multicore CPU 302.

Further, as shown in FIG. 3, a digital camera 348 may be coupled to the multicore CPU 302. In an exemplary aspect, the digital camera 348 is a charge-coupled device (CCD) camera or a complementary metal-oxide semiconductor (CMOS) camera.

As further illustrated in FIG. 3, a stereo audio coder-decoder (CODEC) 350 may be coupled to the multicore CPU 302. Moreover, an audio amplifier 352 may be coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3 further illustrates that a radio frequency (RF) transceiver 368 may be coupled to the multicore CPU 302. An RF switch 370 may be coupled to the RF transceiver 368 and an RF antenna 372. A keypad 375 may be coupled to the multicore CPU 302. Also, a mono headset with a microphone 376 may be coupled to the multicore CPU 302. Further, a vibrator device 378 may be coupled to the multicore CPU 302.

FIG. 3 also shows that a power supply 380 may be coupled to the SoC 102. In a particular aspect, the power supply 380 is a direct current (DC) power supply that provides power to the various components of the PCD 300 that require power. Further, in a particular aspect, the power supply is a rechargeable DC battery or a DC power supply that is derived from an alternating current (AC) to DC transformer that is connected to an AC power source.

FIG. 3 further indicates that the PCD 300 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, a television/cable/satellite tuner, or any other network card well known in the art. Further, the network card 388 may be incorporated into a chip, i.e., the network card 388 may be a full solution in a chip, and may not be a separate network card 388.

Referring to FIG. 3 it should be appreciated that the memory 104, touch screen display 306, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 375, the mono headset 376, the vibrator 378, and the power supply 380 may be external to the on-chip system 102.

Figure 4A:
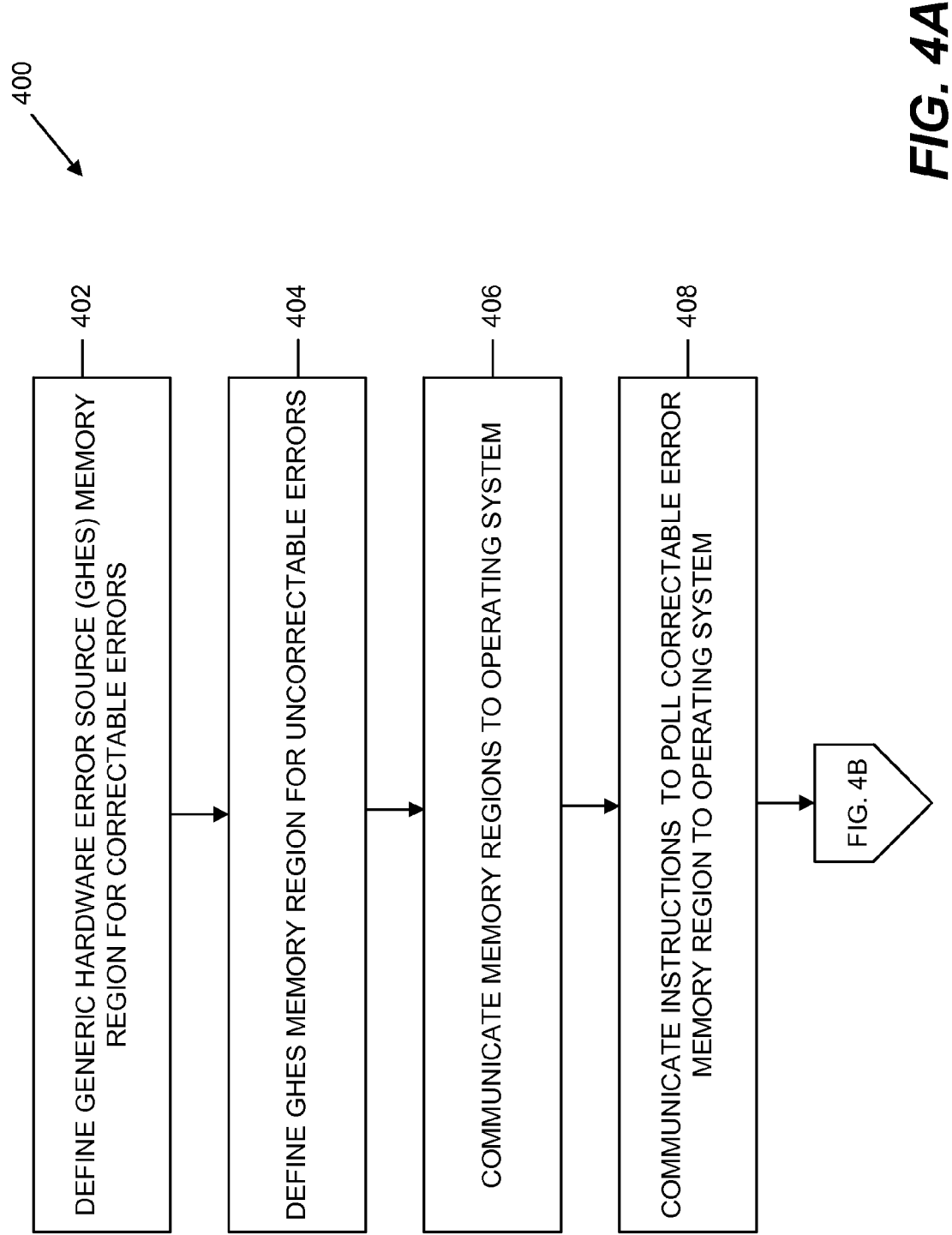
FIG. 4A is a flowchart illustrating an exemplary embodiment of a method for providing operating system independent error control in computing devices.
Figure 4B:
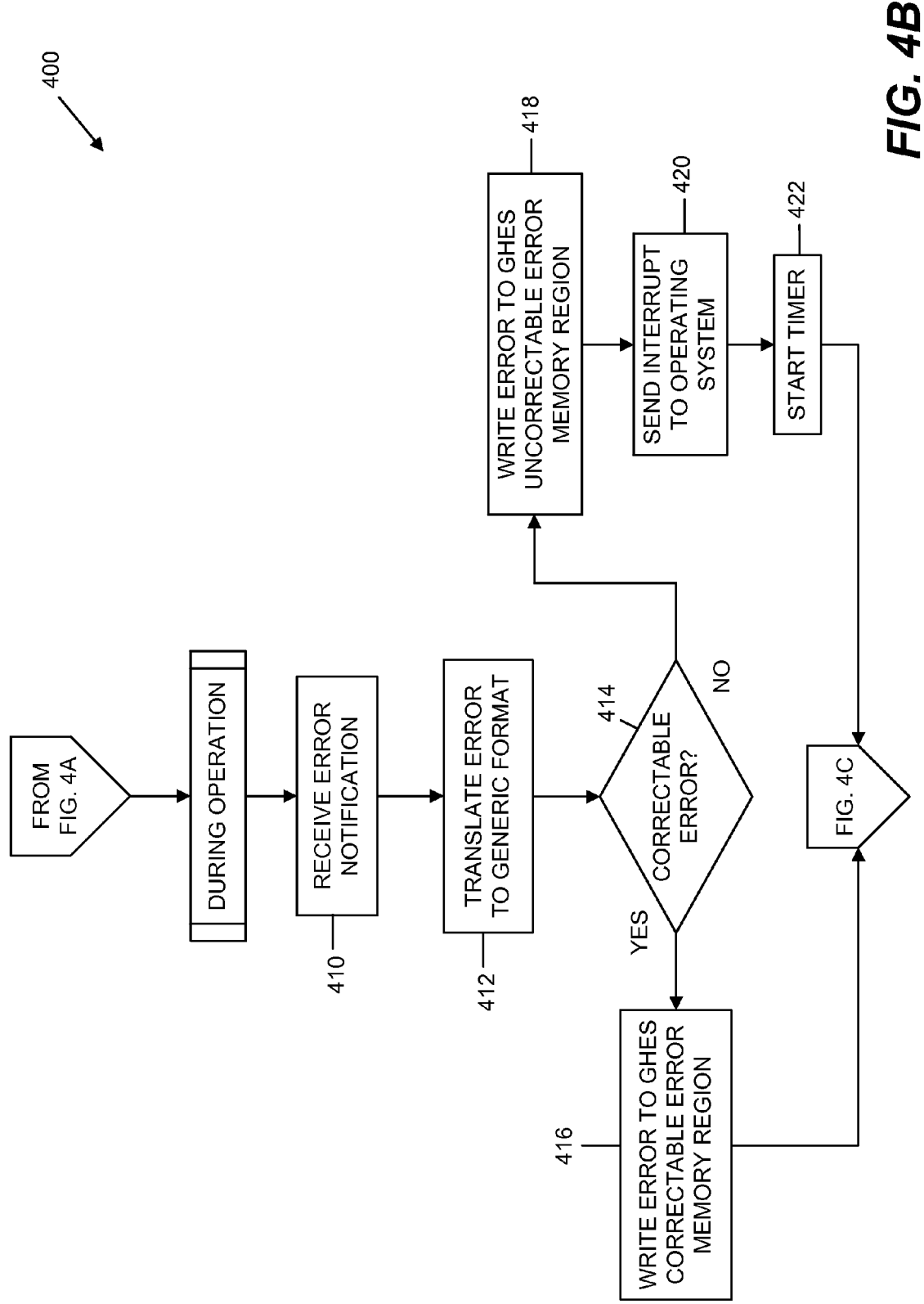
FIG. 4B is a flowchart illustrating additional aspects of the exemplary method for providing operating system independent error control in computing devices.
Figure 4C:
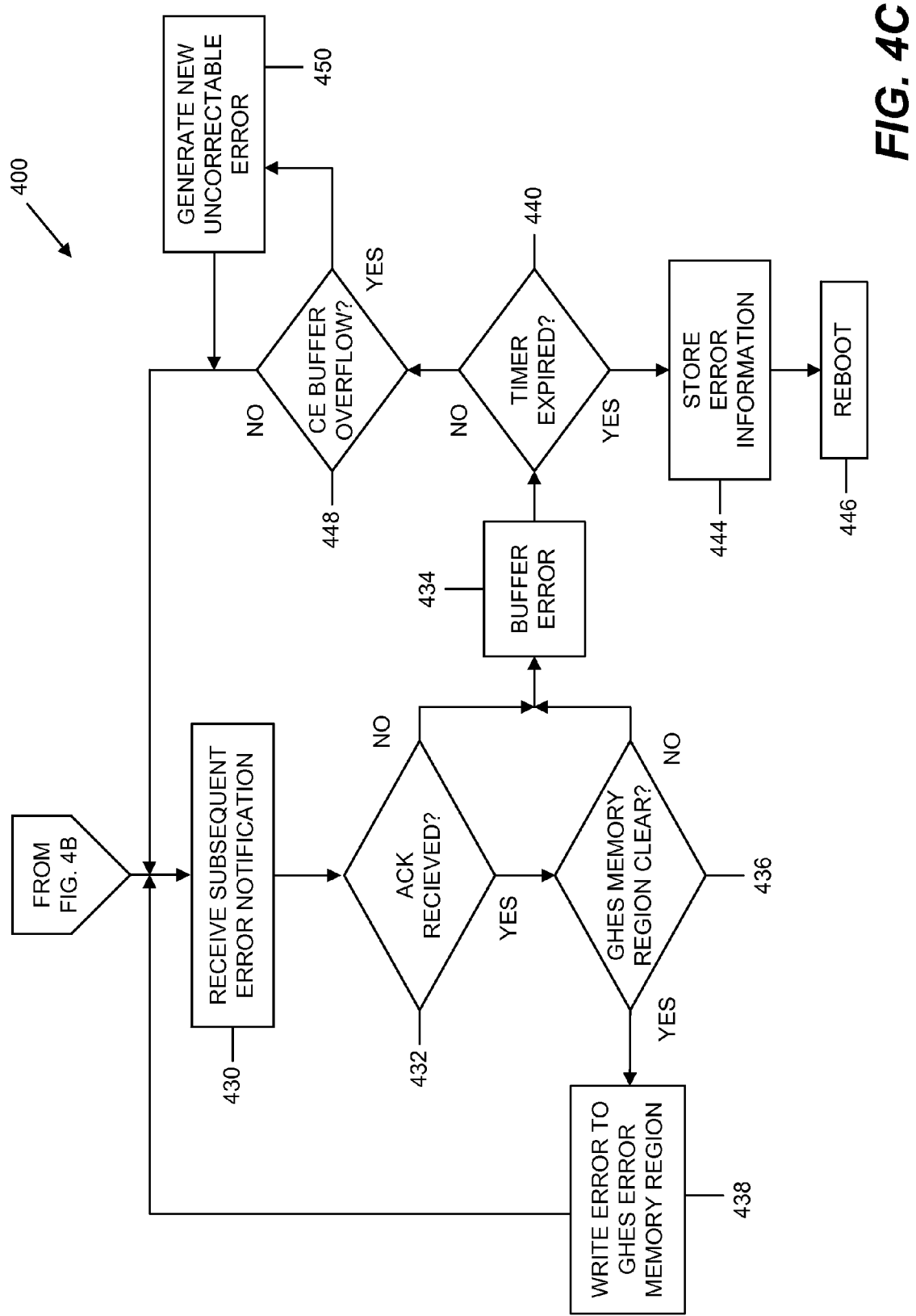
FIG. 4C is a flowchart illustrating additional aspects of the exemplary method for providing operating system independent error control in computing devices.

FIGS. 4A-4C are flowcharts illustrating aspects an exemplary embodiment of a method for providing operating system independent error control in computing devices. The exemplary method 400 illustrated in FIGS. 4A-4C may be implemented by the system 100 of FIG. 1 in an embodiment. Beginning with FIG. 4A, at block 402, a GHES memory region for correctable errors is defined. This memory region will be used to operation to hold information about correctable errors. As discussed above, the GHES memory region may be a GHES poll memory region 144 defined by the RAS Controller 130. In an embodiment, defining the memory region in block 402 may comprise writing the location of the memory region to a location or table, such as firmware table 202 illustrated in FIG. 2A.

At block 404, a GHES memory region for uncorrectable errors is defined. This memory region will be used to operation to hold information about uncorrectable errors. As discussed above, the GHES memory region may be a GHES SCI memory region 142 defined by the RAS Controller 130. In an embodiment, defining the memory region in block 404 may comprise writing the location of the memory region to a location or table, such as firmware table 202 illustrated in FIG. 2A.

At block 406, the memory regions are communicated to the operating system. As discussed above for FIG. 2A, before operation of the system 100 illustrated in FIG. 1, the RAS Controller 130 communicates the location of these memory regions to the O/S 120. In an embodiment, the RAS Controller 130 may communicate the memory region locations directly to the O/S 120, such as when the O/S 120 is booting. In other embodiments, the RAS Controller 130 may write the locations of the memory regions and notification/interrupt type (e.g. SCI interrupt, GPIO, etc. as discussed above) to a location or table, such as firmware table 202, that the O/S 120 reads during boot up. In this manner, when the O/S 120 boots, the locations of the two different memory regions will be loaded to the O/S 120 as part of booting.

At block 408, instructions to poll the correctable error memory region are communicated to the operating system. In an embodiment, the polling instructions may be communicated directly to the operating systems. For example, the RAS Controller 130 may communicate instructions directly to the O/S 120 to periodically poll the GHES poll memory region 144 as discussed for FIG. 2A above. In other embodiments, such polling instructions may instead, or also, be placed in a location accessed by the operating system, such as during boot up. For example, the RAS Controller 130 writing the polling instructions to a location or table, such as firmware table 202, that the O/S 120 reads during boot up as discussed for FIG. 2A. The polling instructions may include instructions when to perform such polling, such as for example, at periodic intervals (either fixed or variable intervals), at times when the CPU 110 is operating below a certain workload threshold (i.e. when the CPU 110 is not "busy"), and/or a combination of both time intervals and workload threshold.

After the memory regions and instruction to poll for correctable errors have been loaded to the operating system in FIG. 4A, the method 400 may continue in FIG. 4B during the operation of the operating system. At block 410, an error may be received, such as at the RAS Controller 130 of FIGS. 1 and 2A. In the method 400 of FIG. 4B, the error is not directly received by the O/S 120 in block 410, but instead by another component, such as RAS Controller 130. The error may be an error from a memory, such as memory 114, DDR memory 108, or L2 cache 112 of FIG. 1. The error received in block 410 may also, or instead, be a bus error such as an error on the SoC bus 115 of FIG. 1. Additionally, the error received in block 410 may also, or instead, be a software error such as an attempt to access an address in a memory that has been powered down. Additional errors may be received in block 410 in other embodiments. For example, as discussed above, for FIG. 2B, various types of errors may be wired to or forwarded to the RAS Controller 130 as desired, such as peripheral errors, disc errors, PCI errors, etc.

At block 412, the information about the error is translated into a standard or generic format that may be understood by a variety of different operating systems. For example, as discussed above for FIG. 2B, a RAS Controller 130 may use logic, such as error translation logic 132 to translate the error information into a standardized format such as GHES. At block 414, a determination is made whether the received error is a correctable error. In an embodiment, the RAS Controller 130 of FIG. 1 or FIG. 2B may use logic (either the same logic used in block 412 or different logic) to make the determination of block 414. As will be appreciated, in some embodiments block 412 and 414 may not be separate blocks or steps, but may instead by a single translation/determination block or step.

If the received error is determined in block 414 to be a correctable error, information about the error is written to the GHES memory region for correctable errors in block 416 and the method 400 continues to FIG. 4C. For example, as discussed above, if an error received by the RAS Controller 130 of FIG. 1 or 2B is a correctable error, RAS Controller 130 writes the error information to the GHES poll memory region 144 and takes no further action for that particular error notification (other than a possible confirmation of receipt to the component sending the error). The O/S 120, according to the instructions previously sent by the RAS Controller 130 (see FIG. 4A), will poll the GHES poll memory region 144 at a future time and take the necessary action(s), if any, at that time to address the correctable error.

If the received error is determined in block 414 to be an uncorrectable error, information about the error is written to the GHES memory region for uncorrectable errors in block 418, and interrupt request is sent to the operating system in block 420. Additionally, in block 422 a timer, such as timer 138 discussed above for FIG. 2B may be started for the uncorrectable error written in block 418 to the GHES uncorrectable memory region (e.g. GHES SCI memory region 142). The method 400 then continues to FIG. 4C. For example, as discussed above, if the error received by the RAS Controller 130 of FIG. 1 or 2B is an uncorrectable error, RAS Controller 130 writes the error information to the GHES SCI memory region 142 and sends an interrupt request to the O/S 120, such as through IRQ bus 117. The O/S 120 upon receiving the interrupt request can immediately take the necessary action(s), if any, to address the uncorrectable error.

After error information has been written to one or more of the GHES memory regions 142, 144 in FIG. 4B, the method 400 may continue in FIG. 4C during operation. As illustrated in FIG. 4C, during operation a subsequent error notification is received in block 430. The subsequent error notification received in block 430 may be a second, third, fourth . . . Nth error notification. Similar to block 410 in FIG. 4B above, the error notification is not directly received by the O/S 120 in block 430, but instead by another component, such as RAS Controller 130. The error notification in block 430 may be any type of error notification discussed above for block 410 of FIG. 4B, including an error from a memory, a bus error, or a software error.

In some embodiments, as part of receiving the subsequent error notification in block 430, a determination may be made as to whether the error notification corresponds to a correctable error or an uncorrectable error as discussed above in block 414 of FIG. 4B. In an embodiment, the RAS Controller 130 of FIG. 1 or FIG. 2B may use logic to determine the type of error. As will be appreciated, in some embodiments the determination of the type of error may not be performed as part of block 430, but may instead be a separate blocks or step taken after the subsequent error notification is received in block 430.

Continuing to block 432 the method 400 determines whether an acknowledgement has been received for error information previously written to one or more error memory region, such as GHES memory regions 142, 144 of FIGS. 1 and 2A-2B. If the determination in block 432 is that an acknowledgement has not been received (such as error acknowledgement 119 of FIG. 2B), information about the subsequent error is buffered in block 434.

As discussed above for FIG. 2B, in some embodiments the O/S 120 sends an error acknowledgement 119 (either directly or indirectly) to the RAS Controller 130 after the O/S 120 has handled an error. As illustrated in FIG. 4C, if the RAS Controller 130 receives a subsequent error notification (block 430) before such error acknowledgement 119 is received from the O/S (block 432), information about the new error will be buffered in block 434. Buffering the error in block 434 may comprise storing a correctable error in CE buffer 134 if the subsequent error notification of block 430 relates to a correctable error. Alternatively, buffering the error in block 434 may comprise storing an uncorrectable error in UE buffer 136 if the subsequent error notification of block 430 relates to an uncorrectable error.

As also discussed in FIG. 2B, for some embodiments the error acknowledgement 119 will just be an acknowledgement that an error has been handled by the O/S 120, and will not include information about the type of error handled. For such embodiments, the RAS Controller 130 will determine what error has been handled by the O/S 120. As illustrated in FIG. 4C, this may accomplished such as by determining which, if any, GHES memory region(s) are clear in block 436. For example, after receiving an error acknowledgement 119 (block 432) an RAS Controller 130 may poll or check one or more of the memory blocks of the GHES memory 140 (see check memory block 159 of FIG. 2B) to determine which error(s) have been handled by the O/S 120. If the determination in block 436 is that the subsequent error received in block 430 corresponds to a previously written error to a GHES memory region 142, 144 that has not been cleared by the O/S 120, the information about the subsequent error is buffered in block 434. Determining whether the GHES memory region 142, 144 is clear in block 436 may occur as part of determining whether an acknowledgement has been received in block 432 (i.e. blocks 432 and 436 may be combined in some embodiments).

Note that in other embodiments, the error acknowledgement 119 received in block 432 may contain information identifying the type of error handled by the O/S 120 and/or which GHES memory region 142, 144 has been cleared or had information deleted by the O/S 120 after error handling. For such embodiments, block 436 would not be performed and/or would be included in the determination in block 432 that an acknowledgement has been received (not illustrated in FIG. 4C).

If the determination in block 436 (or block 432 if the error acknowledgement 119 includes information about error type) is that the subsequent error received in block 430 corresponds to a cleared GHES memory region 142, 144 the method 400 writes error information to the appropriate GHES memory region 142, 144 in block 438. Thus, when a previous error written to a GHES memory 140 has been handled by the O/S 120, and the GHES memory region 142, 144 cleared by the O/S 120, information about a subsequent error can be written to the now-cleared GHES memory region 142, 144.

If error information has been buffered in block 434, writing the error to the GHES error memory region in block 438 will comprise writing information about the next-in-line (first queued) error from the buffer to the appropriate GHES error memory region 142, 144. As an example, assuming information about one or more correctable errors has been buffered in block 434 (such as in CE buffer 134 of FIG. 2B), a determination is made in blocks 432/436 that the O/S 120 has handled a correctable error previously written to GHES poll memory region 144. In this example, block 438 will comprise writing the next-in-line (oldest) buffered error information from the CE buffer 134 to the GHES poll memory region 144. If no information was buffered in the CE buffer 134 in the above example, then block 438 would comprise writing the received correctable error information of block 430 to the GHES poll memory region 144 without first buffering in block 434.

As will be understood, the above example is also true for subsequent uncorrectable errors that may be received (block 430) and/or buffered in block 434. For uncorrectable errors, the buffering in block 434 would be by the UE buffer 136 of FIG. 2B. Similarly, writing the error in block 438 would be to the GHES SCI region 142 of FIG. 2B. Additionally, in the event of an uncorrectable error, writing the error in block 438 will also include sending an interrupt to the O/S 120 as described above in block 420 of FIG. 4B.

The aspects of the method 400 of illustrated in FIG. 4C thus allow the RAS Controller 130 to avoid overwriting the GHES memory regions 142, 144 before the O/S 120 has an opportunity to address any previous errors stored in those memory regions 142, 144. Additionally, the RAS Controller 130 can ensure that information about each additional error received (block 430) before the O/S 120 acknowledges handling previous errors (block 432) is preserved and buffered (block 434) until the O/S 120 has handled the previous error(s).

FIG. 4C also illustrates exemplary steps that may occur as part of detecting or addressing abnormal operation of the system 100/200 of FIGS. 1 and 2A-2B, such as a nonresponsive O/S 120. For example, if a timer 138 has been set for an uncorrectable error written to the GHES memory region 142 (see block 422 of FIG. 4B), a determination may be made, such as by RAS Controller 130, whether the timer 138 has expired in block 440 of FIG. 4C.

Note that block 440 may take place at any time during the method 400, and may instead comprise a receipt at the RAS Controller 130 of an expiration notification or interrupt from the timer 138 rather than a determination by the RAS Controller 130. Regardless of how received or determined, if the timer 138 associated with an uncorrectable error written to GHES SCI memory region 142 has expired (block 440) the RAS Controller 130 may take corrective action. For example, as illustrated in FIG. 4C if the timer 138 has expired in block 440, information about the uncorrectable error associated with the expired timer 138 (as well as additional error information such as information stored in GHES poll memory region 144, CE buffer 134 and/or UE buffer 136) may be stored in block 444. Storage in block 444 may comprise storing such error information in a non-transitory or persistent memory that is available to or accessed by the O/S 120 when the O/S boots up. The RAS Controller 130 may take additional corrective action, such as causing a reboot in block 446. As discussed above for FIG. 2B, this reboot may be a warm reboot of one or more components of the system 100/200, may be a cold reboot of the entire system 100/200.

Additionally, as illustrated in FIG. 4C, the CE buffer 134 may also be used to detect abnormal operation of the system 100/200 of FIGS. 1 and 2A-2B, such as a nonresponsive O/S 120. For example, a determination may be made in block 448 of a CE buffer 134 overflow indicating an abnormal operation of the system 100/200 as discussed above in FIG. 2B. Note that the determination of the CE buffer 134 overflow may be a separate step or block 448 as illustrated in FIG. 4C, but may take place at a different time than illustrated in FIG. 4C, such as before correctable error information is written to the CE buffer 134 in block 434 of the method 400. In other embodiments, the determination of block 448 may not be a separate step, but may be part of buffering correctable errors to the CE buffer 134 in block 434 of FIG. 4C.

Regardless of when it occurs, a determination a CE buffer 134 overflow may be treated by the RAS Controller 130 as a new uncorrectable error. As illustrated in FIG. 4C the RAS Controller 130 may in block 450 generate a new uncorrectable error as a result of the CE buffer 134 overflow. This new uncorrectable error will then either be written to the GHES SCI memory region (along with subsequent interrupt to the O/S 120) or will be buffered in the UE buffer 136 in accordance with the above-described steps of the method 400.

Figure 5:
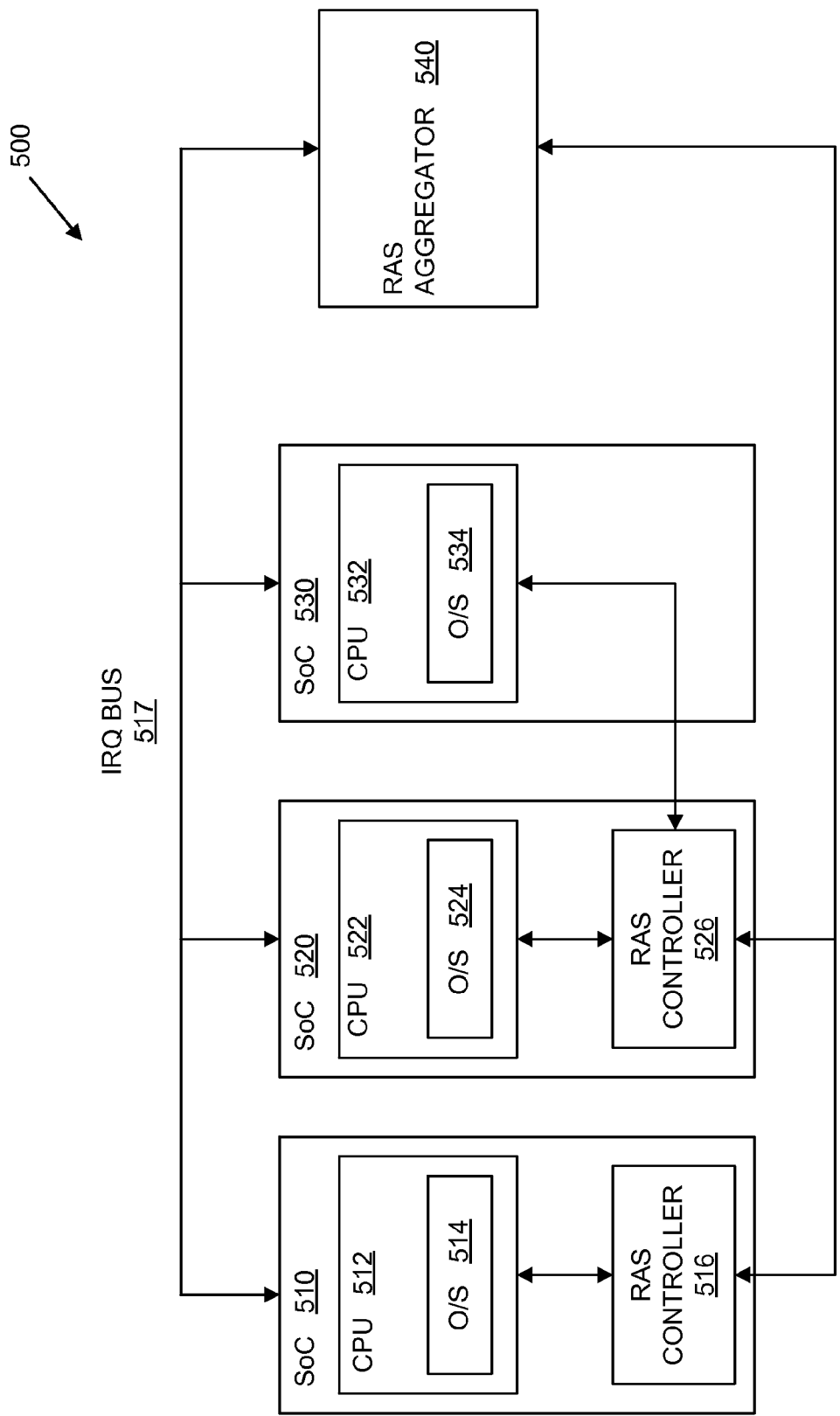
FIG. 5 is a block diagram of an exemplary embodiment of another computing device that may incorporate the systems and methods for providing operating system independent error control.

It should be appreciated that the systems and methods described above for providing operating system independent error control may be incorporated into computing devices containing multiple SoCs. For example, FIG. 5 illustrates an exemplary embodiment of another computing device 500 that may incorporate the systems and methods for providing operating system independent error control. As illustrated in FIG. 5, the computing device 500 may include multiple SoCs 510, 520, 530. The computing device 500 may be a single device such as a server with multiple blades or boards comprising one of the SoCs 510, 520, 530. The computing device 500 may, in other embodiments, comprise separate devices with their own SoCs.

The SoCs 510, 520, 530 may each be similar to SoC 102 discussed above for FIG. 1. For clarity, only a few of the components of SoCs 510, 520, 530 are illustrated in FIG. 5. However, it will be understood that each of SoC 510, 520, 530 may, but does not necessarily, include the additional components of SoC 102 discussed above. Each of SoC 510, 520, 530 includes at least one processor CPUs 512, 522, 532, respectively, but may include additional processors as discussed above.

Additionally, each CPU 512, 522, 532 is each operating an operating system O/S 514, 524, 534, respectively, which may be the same or different operating systems. In other words, O/S 514 may be a first version of Linux, O/S 524 may be a second version of Linux, and O/S 534 may be a version of Windows. In other embodiments, O/S 514, 524, 534 may be the same operating system running on multiple sockets/dies. In yet other embodiments, one or more of O/S 514, 524, 534 could instead be a hypervisor or virtual machine monitor (VMM) implementing a virtual machine. Other combinations and types of operating systems may be implemented in other embodiments.

SoC 510 also includes a RAS Controller 616 similar to RAS Controller 130 discussed above for FIGS. 1 and 2A-2B. Similarly, RAS Controller 526 on SoC 520 is in communication with both O/S 524 of SoC 520 and O/S 534 of SoC 530. RAS Controller 626 is also similar to RAS Controller 130 and provides similar functionality described above for both O/S 524 and O/S 534. In some embodiments, the RAS Controllers 516, 526 operate in the same manner as discussed above for FIGS. 1, 2A-2B, and 4A-4B, each RAS Controller 516, 526 providing the same translation and determination of correctable/uncorrectable errors, and sending interrupts to the O/S 514, 524, 534 in the event of an uncorrectable error as discussed above.

In other embodiments, such as illustrated in FIG. 5, the device 500 may also include an RAS aggregator 540 in communication with the RAS Controllers 516, 526 and the CPUs 512, 522, 532. The RAS aggregator 540 may be a separate component as illustrated in FIG. 5, or may in other embodiments be part of one of RAS Controller 516, 526. In the embodiment of FIG. 5, the RAS Controllers 516, 526 may establish the memory regions as discussed above for FIG. 4A and may also receive the errors, and perform the translation/determinations as discussed above in FIG. 4B (see FIG. 6).

However, the RAS Controllers 516, 526 send any interrupt requests for received uncorrectable errors to the RAS aggregator 540 instead of sending the interrupt directly to the O/S 514, 524, 534. The RAS aggregator 540 then determines which O/S 514, 524, 534 to send the interrupt(s) to, such as over IRQ bus 617, preventing multiple interrupts being sent for the same uncorrectable error. Similarly, the RAS Controllers 516, 526 also send a notification of received correctable errors to the RAS aggregator 540 so that the RAS aggregator may determine any further action needed.

Figure 6:
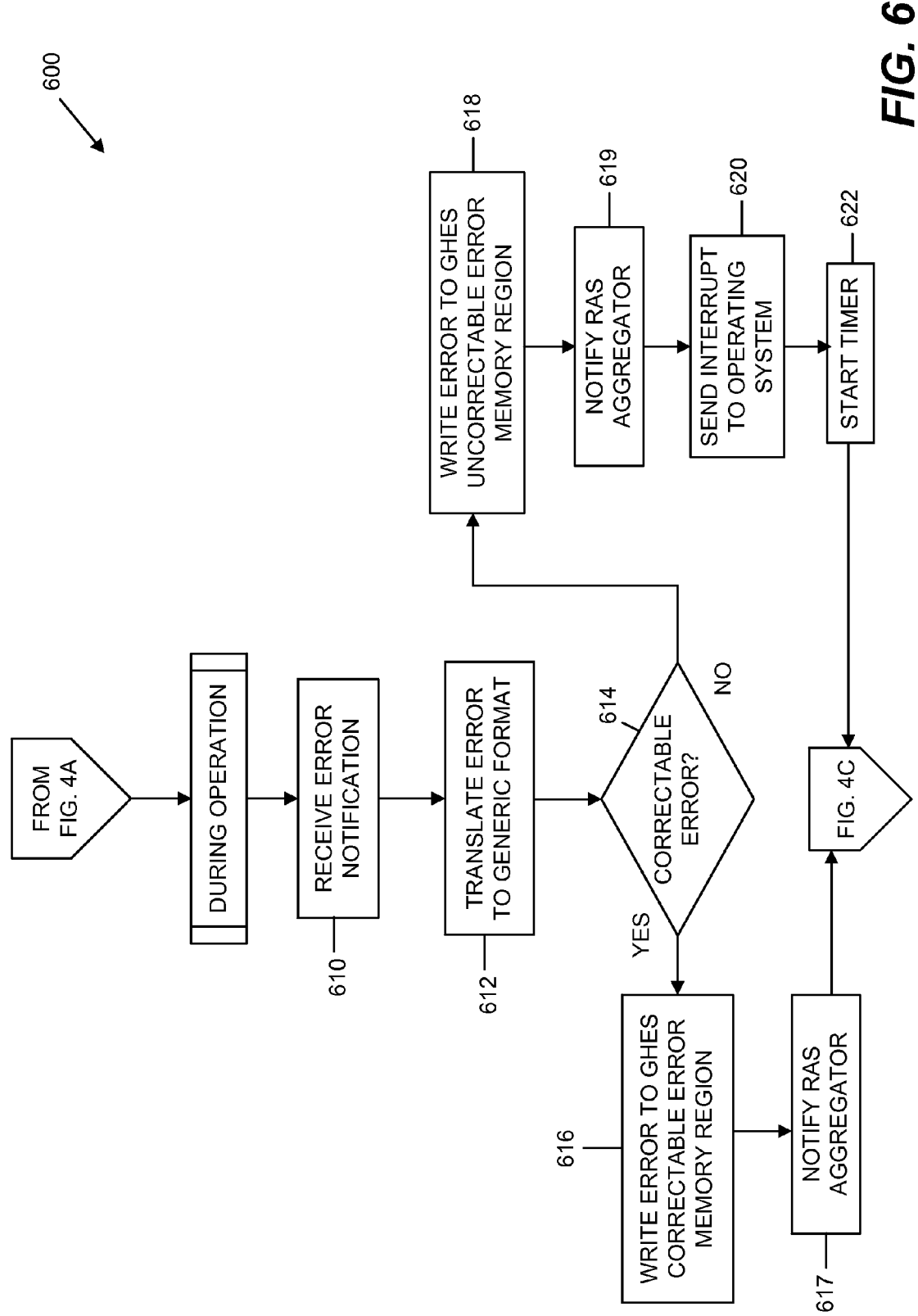
FIG. 6 is a flowchart illustrating an exemplary embodiment of a method for providing operating system independent error control in the computing device of FIG. 5.

FIG. 6 is a flowchart illustrating an exemplary embodiment of a method 600 (similar to the steps of FIG. 4B) for providing operating system independent error control in the computing device of FIG. 5. Each of the RAS Controllers 516, 526 establishes the memory regions, and communicates the memory and polling instructions to the O/S 514, 524, 534 as described above for FIG. 4A. Then, as illustrated in FIG. 6, during operation each of the RAS Controllers 516, 516 may receive an error (block 610), translate the error to a generic format (block 612), determine if the error is correctable (block 614) and write the information about the error to the appropriate GHES memory regions (blocks 616, 618) as described above for blocks 410, 412, 414, 416, and 418 of FIG. 4B.

However, for correctable errors, the RAS Controllers 516, 626 will also notify the RAS Aggregator 540 of the correctable error before the method 600 returns. Similarly, for uncorrectable errors, after writing information to the GHES uncorrectable memory region, the RAS Controller 516, 526 notifies the RAS aggregator 540 in block 619, and the RAS aggregator sends the interrupt request to the appropriate O/S 514, 524, 534 in block 620 (similar to block 420 of FIG. 4B) and starts any timer 138 in block 622 (similar to block 422 of FIG. 4B).

Certain steps in the processes or process flows described in this specification, including FIGS. 4A-4C and 6 naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention, as discussed above. Further, words such as "thereafter", "then", "next", etc. are not intended to limit the order of the steps. These words are simply used to guide the reader through the description of the exemplary method.

It should be appreciated that one or more of the method steps described herein in FIGS. 4A-4C and FIG. 6 may be stored in a memory as computer program instructions. These instructions may be executed by any suitable processor in combination or in concert with other components to perform the methods described herein. Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for providing operating system independent error control in computing devices, the method comprising:

defining with a reliability, availability and serviceability (RAS) controller a first memory region configured to store information about correctable errors and a second memory region configured to store information about uncorrectable errors;

receiving an error indication at the RAS controller indicating whether an error is a correctable error or an uncorrectable error;

determining with the RAS controller whether the received error indication indicates the error is a correctable error; and in response to the determination,
 if the received error indication indicates the error is a correctable error, writing with the RAS controller information about the correctable error to the first memory region and not to the second memory region, and
 if the received error indication indicates the error is an uncorrectable error, writing with the RAS controller information about the uncorrectable error to the second memory region and not to the first memory region and sending an interrupt request from the RAS controller to an operating system executing on a processor; and polling the first memory region to determine whether there is a correctable error to handle.

2. The method of claim 1, wherein the RAS controller comprises a second processor separate from the processor executing the operating system.

3. The method of claim 1, further comprising:
communicating a location of the first and second memory regions to an operating system and communicating a polling instruction associated with the first memory region.

4. The method of claim 3, wherein polling the first memory region is performed in accordance with the polling instruction.

5. The method of claim 3, wherein communicating the location of the first and second memory regions to the operating system further comprises:
writing with the RAS controller the address of the first and second memory regions to a firmware table accessed by the operating system.

6. The method of claim 1, further comprising:
translating the received error into a standard hardware error format.

7. The method of claim 6, wherein the standard hardware error format comprises a generic hardware error source (GHES) format.

8. The method of claim 1, further comprising:
receiving at the RAS controller an error acknowledgement indicating an error associated with the information in the first memory region or the second memory region has been handled.

9. The method of claim 8, further comprising:
receiving a second error indication at the RAS controller, the second error indication being received before the error acknowledgement is received; and
writing information about the second error indication to a buffer.

10. The method of claim 9, further comprising:
writing with the RAS controller information about the second error indication from the buffer to the first memory region or second memory region in response to the received error acknowledgement.

11. A system for providing operating system independent error control, the system comprising:

a system on chip (SoC) comprising a processing device executing an operating system and a reliability, availability and serviceability (RAS) controller coupled to the processing device, the RAS controller configured to:
 define a first memory region configured to store information about correctable errors,
 define a second memory region configured to store information about uncorrectable errors,
 receive an error indication indicating whether an error is a correctable error or an uncorrectable error,
 determine whether the received error indication indicates the error is a correctable error, and
 in response to the determination,
  if the received error indication indicates the error is a correctable error, write information about the correctable error to the first memory region and not to the second memory region, and
  if the received error indication indicates the error is an uncorrectable error, write information about the uncorrectable error to the second memory region and not to the first memory region and send an interrupt request to the operating system, and the operating system is configured to poll the first memory region to determine whether there is a correctable error to handle.

12. The system of claim 11, wherein the RAS controller comprises a second processing device separate from the processing device executing the operating system.

13. The system of claim 11, wherein the RAS controller is configured to:
communicate a location of the first and second memory regions to the operating system and communicate a polling instruction associated with the first memory region.

14. The system of claim 13, wherein the operating system is configured to:
poll the first memory region in accordance with the polling instruction.

15. The system of claim 13, wherein the RAS controller is configured to communicate the location of the first and second memory regions to the operating system by:
writing the address of the first and second memory regions to a firmware table accessed by the operating system.

16. The system of claim 11, wherein the RAS controller is configured to:
translate the received error into a standard hardware error format.

17. The system of claim 16, wherein the standard hardware error format comprises a generic hardware error source (GHES) format.

18. The system of claim 11, wherein the RAS controller is configured to:
receive an error acknowledgement from the operating system indicating an error associated with the information in the first memory region or the second memory region has been handled by the operating system.

19. The system of claim 18, wherein the RAS controller is configured to:
receive a second error indication, the second error indication being received before the error acknowledgement is received; and
write information about the second error indication to a buffer in communication with the RAS controller.

20. The system of claim 19, wherein the RAS controller is configured to:

write information about the second error indication from the buffer to the first memory region or second memory region in response to the received error acknowledgement.

21. A computer program stored in a non-transitory memory and executable by a processor for providing operating system independent error control, the computer program comprising logic configured to:
define a first memory region configured to store information about correctable errors;
define a second memory region configured to store information about uncorrectable errors;
receive an error indication at a controller indicating whether an error is a correctable error or an uncorrectable error;
determine whether the received error indication indicates the error is a correctable error; and
in response to the determination,
if the received error indication indicates the error is a correctable error, write information about the correctable error to the first memory region and not to the second memory region, and
if the received error indication indicates the error is an uncorrectable error, write information about the uncorrectable error to the second memory region and not to the first memory region and send an interrupt request to an operating system executing on a processor, and
poll the first memory region to determine whether there is a correctable error to handle.

22. The computer program of claim 21, wherein the controller comprises a second processor separate from the processor executing the operating system.

23. The computer program of claim 21, wherein the logic is further configured to:
communicate a location of the first and second memory regions to an operating system and communicate a polling instruction associated with the first memory region.

24. The computer program of claim 23, wherein the logic is further configured to:
poll the first memory region in accordance with the polling instruction.

25. The computer program of claim 23, wherein the logic configured to communicate the location of the first and second memory regions to the operating system comprises logic configured to:
write the address of the first and second memory regions to a firmware table accessed by the operating system.

26. A system for providing operating system independent error control in computing devices, the system comprising:
means for defining a first memory region configured to store information about correctable errors;
means for defining a second memory region configured to store information about uncorrectable errors;
means for receiving an error indication at a controller indicating whether an error is a correctable error or an uncorrectable error;
means for determining whether the received error indication indicates the error is a correctable error; and
in response to the determination,
if the received error indication indicates the error is a correctable error, means for writing information about the correctable error to the first memory region and not to the second memory region, and
if the received error indication indicates the error is an uncorrectable error, means for writing information about the uncorrectable error to the second memory region and not to the first memory region and means for sending an interrupt request to an operating system executing on a processor, and
means for polling the first memory region to determine whether there is a correctable error to handle.

27. The system of claim 26, wherein the controller comprises a second processor separate from the processor executing the operating system.

28. The system of claim 26, further comprising:
means for communicating a location of the first and second memory regions to an operating system and means for communicating a polling instruction associated with the first memory region.

29. The system of claim 28, wherein the means for polling the first memory region is configured to poll the first memory region in accordance with the polling instruction.

30. The system of claim 28, wherein the means for communicating the location of the first and second memory regions to the operating system further comprises:
means for writing the address of the first and second memory regions to a firmware table accessed by the operating system.

* * * * *